(12) United States Patent
Raghunathan et al.

(10) Patent No.: US 8,983,690 B2
(45) Date of Patent: Mar. 17, 2015

(54) SYSTEM AND METHOD FOR OPTIMIZING ENERGY CONSUMPTION IN RAILWAY SYSTEMS WITH ENERGY STORAGE DEVICES

(71) Applicants: Mitsubishi Electric Research Laboratories, Inc., Cambridge, MA (US); Mitsubishi Electric Corporation, Chiyoda-ku, Tokyo (JP)

(72) Inventors: Arvind U Raghunathan, Brookline, MA (US); Yunwen Xu, Urbana, IL (US); Toshihiro Wada, Tokyo (JP); Kenji Ueda, Tokyo (JP); Satoru Takahashi, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/188,767

(22) Filed: Feb. 25, 2014

(65) Prior Publication Data

US 2014/0277861 A1    Sep. 18, 2014

Related U.S. Application Data

(63) Continuation-in-part of application No. 13/803,857, filed on Mar. 14, 2013, now Pat. No. 8,831,801.

(51) Int. Cl.
*B60L 9/04* (2006.01)
*G06F 17/11* (2006.01)
(Continued)

(52) U.S. Cl.
CPC . *B61L 99/00* (2013.01); *B60L 9/04* (2013.01); *G06F 17/11* (2013.01); *G06Q 50/06* (2013.01);
(Continued)

(58) Field of Classification Search
CPC ....... B60L 99/00; B60L 2200/26; B60L 9/04; B60L 11/1842; G06F 17/11; G06Q 50/06; B61L 27/0027; B61L 2027/00
See application file for complete search history.

(56) References Cited

U.S. PATENT DOCUMENTS 5,467,945 A * 11/1995 Kubota et al. .................. 246/26
7,430,967 B2   10/2008 Kumar et al.
(Continued)

OTHER PUBLICATIONS

Kim et al.; "A Mathematical Approach for Reducing the Maximum Traction Energy: The Case of Korean MRT Trains"; IMECS, Mar. 17-19, 2010.*
(Continued)

*Primary Examiner* — Michael J Zanelli
(74) *Attorney, Agent, or Firm* — Dirk Brinkman; Gene Vinokur

(57) ABSTRACT

A system and method optimizes energy consumption in a railway system including a set of trains, a set of energy storage devices, and a set of substations connected to a grid by first optimizing control parameters controlling at least part of the energy consumption of the railway system to produce optimized control parameters. The optimized control parameters minimize, over multiple time steps, a combination of total power provided by the grid to satisfy a power demand of the railway system, a state-of-charge of each energy storage device, power supplied to charge the energy storage device and power supplied by the energy storage device. The optimizing is subject to constraints on operations of the railway system over multiple time steps. The constraints include a complementarity constraint. A command is generated to control the energy consumption of the railway system based on the optimized control parameters.

13 Claims, 12 Drawing Sheets

(51) Int. Cl.
*G06Q 50/00* (2012.01)
*B61L 99/00* (2006.01)
*G06Q 50/06* (2012.01)
*B60L 11/18* (2006.01)
*B60L 7/12* (2006.01)
*B60L 11/16* (2006.01)
*B60L 15/20* (2006.01)

(52) U.S. Cl.
CPC . *B60L 7/12* (2013.01); *B60L 11/16* (2013.01); *B60L 11/1805* (2013.01); *B60L 11/1861* (2013.01); *B60L 15/2045* (2013.01); *B60L 2200/26* (2013.01); *B60L 2210/10* (2013.01); *B60L 2240/547* (2013.01); *B60L 2240/549* (2013.01); *B60L 2240/80* (2013.01)
USPC ............................................. 701/19; 700/291

(56) References Cited

U.S. PATENT DOCUMENTS

| | | | |
|---|---|---|---|
| 7,715,958 | B2 | 5/2010 | Kumar et al. |
| 7,940,016 | B2 | 5/2011 | Donnelly et al. |
| 8,146,513 | B2 * | 4/2012 | Ibaiondo Madariaga et al. ............................. 104/289 |
| 8,538,611 | B2 | 9/2013 | Kumar et al. |
| 8,674,541 | B2 * | 3/2014 | Peitzke et al. ................. 307/9.1 |
| 2005/0000386 | A1 | 1/2005 | Inarida et al. |
| 2006/0005738 | A1 | 1/2006 | Kumar et al. |
| 2011/0316333 | A1 * | 12/2011 | Still ................................ 307/9.1 |
| 2013/0147441 | A1 * | 6/2013 | Lee et al. ....................... 320/167 |
| 2013/0166232 | A1 * | 6/2013 | Lee et al. ......................... 702/62 |
| 2014/0012454 | A1 * | 1/2014 | Fournier et al. ................. 701/23 |

OTHER PUBLICATIONS

Nasri et al.; "Timetable Optimization for Maximum Usage of Regenerative Energy of Braking in Electrical Railway Systems"; SPEEDAM 2010; Intl. Sym. on Power Electronics, Electrical Drives, Automation and Motion; pp. 1218-1221; IEEE, 2010.*

Gonzalez et al.; "Power Losses Minimization in D.C. Electric Railways by means of Traction Substations Coordinated Voltage Control"; Conf. on Railway Traction Systems (RTS 2010); Apr. 13-15, 2010; pp. 1-5.*

* cited by examiner

100

200

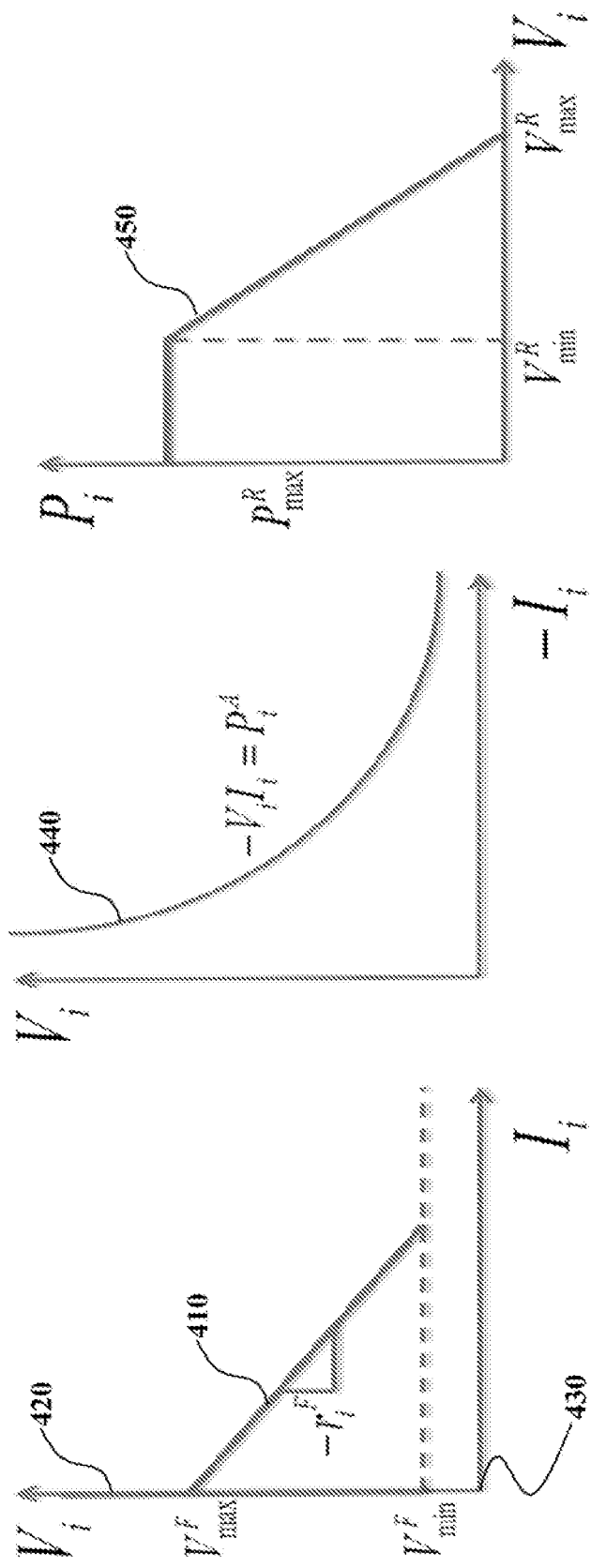
*Fig. 4A*  *Fig. 4B*  *Fig. 4C* optimization $$\min \sum_{t=1}^{T}\left(\sum_{i \in N^F} V_i(t) I_i(t) + \sum_{i \in N_s} f_s(V_i(t), I_i(t), I_i^c(t), I_i^d(t), SOC_i(t))\right)$$

s.t.

$$V_i(t) \geq V^{F,\min}$$

$$V_i(t) = V^{F,\max} - r^F I_i(t) + \alpha_i(t)$$
$$I_i(t) \geq 0, \alpha_i(t) \geq 0, I_i(t)\alpha_i(t) = 0 \quad\}\forall i \in N^F$$

$$V_i(t)I_i(t) = -P_t^A(t)$$
$$V_i(t) \geq 0, I_i(t) \leq 0 \quad\}\forall i \in N^A$$

$$V_i(t) \geq V^{R,\min}$$

$$V_i(t)I_i(t) \leq P^{R,\max}$$

$$V_i(t) \leq V^{R,\max} - \frac{V^{R,\max} - V^{R,\min}}{P^{R,\max}} I_i(t)$$

$$I_i(t) \geq 0$$

$$V^S_{\min} \leq V_i(t) \leq V^S_{\max}$$
$$-I^c_{\max} \leq I_i(t) \leq I^d_{\max}, \quad -I^c_{\max} \leq I_i^d(t) \leq I^d_{\max}$$
$$SOC_{\min} \leq SOC_i(t) \leq SOC_{\max}$$

$$SOC_i(t+1) = SOC_i(t) - \frac{I_{bat,i}(t) \Delta t}{Q_i}$$

$$V_{bat,i}(t) = V_{bat,i}(t) - I_{bat,i}(t) R_i + I_{bat,i}^c(t) R_i$$
$$V_{tcv,i}(t)I_i^d(t) = \eta V_{tcv,i}(t) I_{bat,i}^d(t)$$
$$\eta V_i(t) I_i^c(t) = V_{tcv,i}(t) I_{bat,i}^c(t)$$
$$V_{bat,i}(t) = \text{constan } t$$
$$I_{bat,i}(t) = I^d_{bat,i}(t) - I^c_{bat,i}(t)$$
$$I^d_{bat,i}(t) \geq 0, I^c_{bat,i}(t) \geq 0, I^d_{bat,i}(t) I^c_{bat,i}(t) = 0 \quad\}\forall i \in N^S$$

$$V_i(t) - V_j(t) = R_{ij} I_{ij}(t)$$
$$I_i(t) + I_i(t) = \sum_{(i,j)\in E} I_{ij}(t) \quad\forall i \in N$$

610 measurements at nodes $N$ - set of nodes
$E$ - set of edges
$N^F$ - set of nodes that are feeding stations
$N^A$ - set of nodes that are consuming trains
$N^R$ - set of nodes that are regenerating trains
$N^S$ - set of nodes that are storage devices
$\Delta t$ - time - step
$T$ - number of time - steps in the optimization $V^{F,\min}, V^{F,\max}$ - min and max voltages at feeding stations
$r^F$ - internal resistance at feeding stations
$P_t^A$ - power required by consuming train
$V^{R,\min}, V^{R,\max}$ - min and max voltages at regenerating trains
$P^{R,\max}$ - max power from regenerating trains
$R_{ij}$ - line resistance $V^S_{\min}, V^S_{\max}$ - minimum and maximum voltages at storage nodes
$V_{bat,i}$ - voltage at battery
$V_{tcv,i}$ - voltage at power converter on battery side
$I^c_{bat,i}, I^d_{bat,i}$ - charging and discharging currents for battery
$I_i^c, I_i^d$ - charging and discharging currents for storage device
$SOC_i$ - state - of - charge of storage device
$\eta_i$ - efficiency of the power converter module
$R_i$ - internal resistance of the storage device
$Q_i$ - capacity of the storage device $V_i$ - node voltages
$I_i$ - current injected at nodes
$I_{ij}$ - line currents
$\alpha_i$ - measure of feeding station max voltage violation

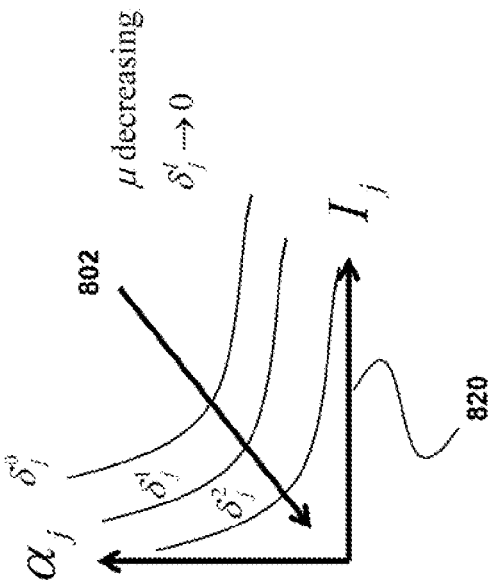
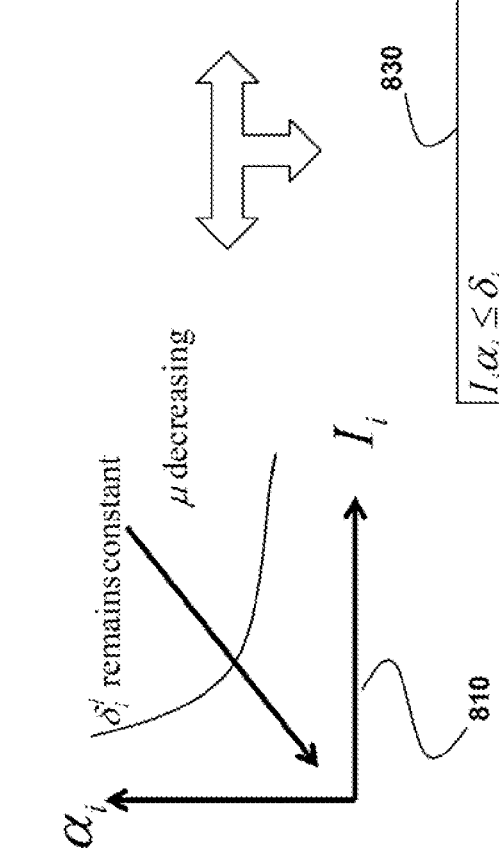
Fig. 8

1. Let $z^0 = (V^0, (V_{bat})^0, (V_{ter})^0, I^0, (I_i)^0, (I^L)^0, (I^c)^0, (I^d)^0, (I_{bat}^c)^0, (I_{bat}^d)^0, a^0, SOC^0, s^0, (s^c)^0)$
   with $s > 0, (I_i)^0, a^0, (s_i^c)^0 > 0 i \in N^F, (I_{bat,i}^c)^0, (I_{bat,i}^d)^0, (s_i^c)^0 > 0 i \in N^S$
2. Choose $\delta > 0, \mu^0 > 0, \tau \in (0,1), \beta \in (0,1)$, and tolerance $\epsilon > 0$
3. Set $l = 0$
4. while $\mu^l \ge \epsilon$ do
5.    Solve barrier problem in (14) using $z^l$ to obtain $z^{l+1}$
6.    Set $\mu^{l+1} = \min(\beta \mu^l, (\mu^l)^{1+\tau})$
7.    Set $l = l + 1$
8. end
9. return $z^l$ as solution

Inequality Reformation

*Fig. 9*

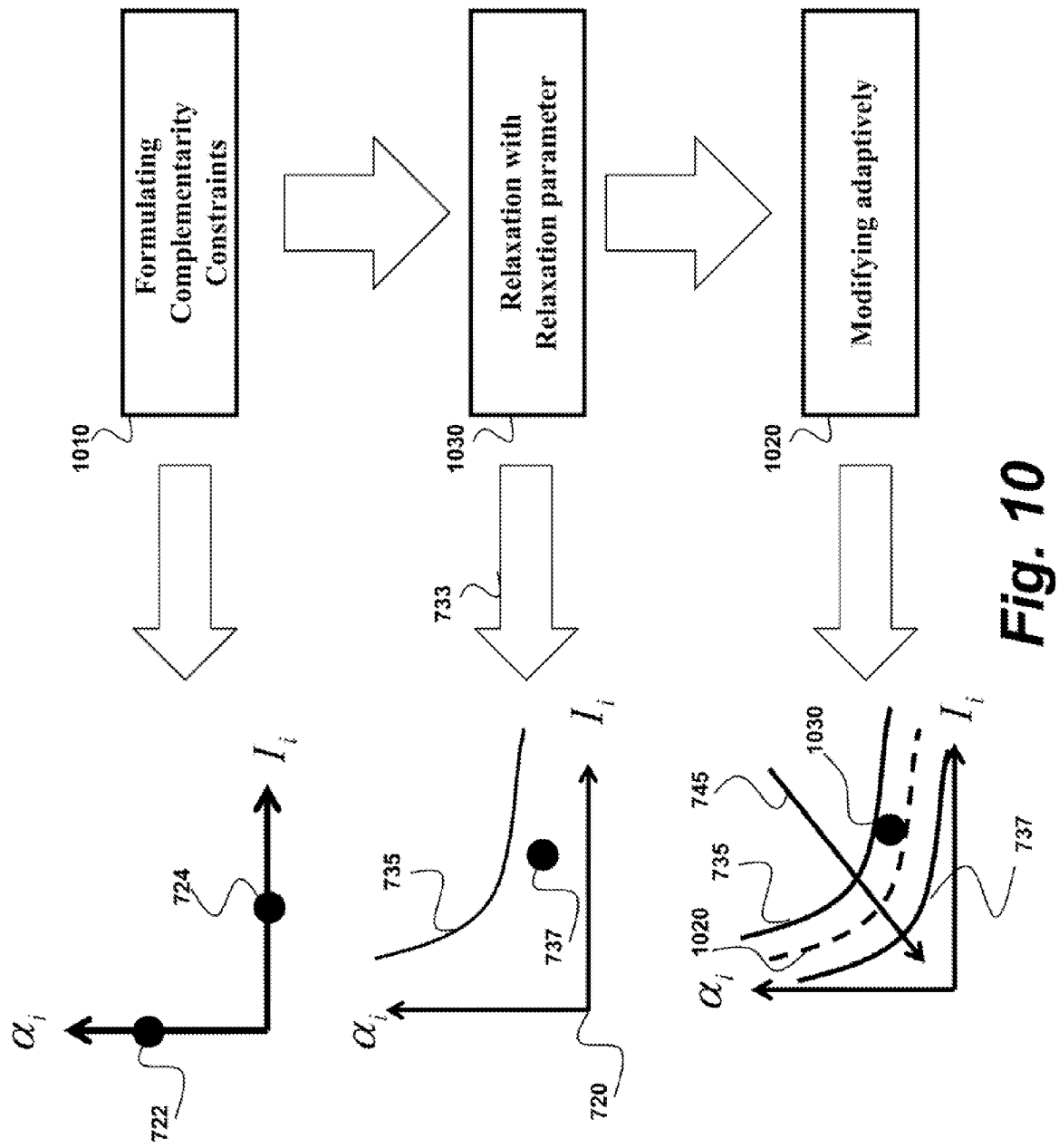

1. Let $z^0 = (V^0, (V_{bat})^0, (V_{ter})^0, I^0, (I_1)^0, (I^c)^0, (I^d)^0, (I^c_{bat})^0, (I^d_{bat})^0, \alpha^0, SOC^0, s^0, (s^c)^0)$
   with $s > 0, (I_1)^0, \alpha^0, (s^c_i)^0 > 0, i \in N^F, (I^c_{bus,i})^0, (I^d_{bus,i})^0, (s^c_i)^0 > 0, i \in N^S$ 2. Choose $\delta > 0, \mu^0 > 0, \tau \in (0,1], \beta \in (0,1)$, and tolerance $\epsilon > 0$ 3. Set $l = 0, \eta_i = \mu^l, i \in N^F \cup N^S$ 4. while $\mu^l > \epsilon$ do 5.    Solve barrier problem in (15) using $z^l$ to obtain $z^{l+1}$ 6.    Set $\mu^{l+1} = \min(\beta\mu^l, (\mu^l)^{1+\tau})$ 7.    for $i \in N^F$ do 8.      if $I^{l+1}_i \alpha^{l+1}_i > \delta\mu^l$ then 9.        Set $\eta_i = \delta\mu^{l+1}$ 10.      end 11.    for $i \in N^S$ do 12.      if $(I^c_{bus,i})^{l+1}(I^d_{bus,i})^{l+1} > \delta\mu^l$ then 13.        Set $\eta_i = \delta\mu^{l+1}$ 14.      end 15.    end 16.    Set $l = l + 1$ 17. end 18. return $z^l$ as solution

ADAPTIVE RELAXATION
1200

*Fig. 12*

SYSTEM AND METHOD FOR OPTIMIZING ENERGY CONSUMPTION IN RAILWAY SYSTEMS WITH ENERGY STORAGE DEVICES

RELATED APPLICATION

This application is a Continuation-in-Part of U.S. patent application Ser. No. 13/803,857, "System and Method for Optimizing Energy Consumption in Railway Systems," filed by Raghunthan et al. on Mar. 14, 2013.

FIELD OF THE INVENTION

This invention relates generally to railway systems, and more particularly to optimizing energy consumption in railway systems.

BACKGROUND OF THE INVENTION

It is desired to reduce energy consumption in railway systems. Several methods are known that reduce energy during an operation of the railway systems. However, the conventional methods generally use static models, or only consider energy efficiency of the individual trains. For example, various run curve optimization methods can reduce energy consumption of the train. Regenerative braking can provide additional energy for the train. Although the conventional methods can increase energy efficiency, those methods do not consider global optimization of the operation of the railway system, and do not minimize total energy consumption.

Further, there are times when amount of available regenerated energy exceeds the demand from other trains and is consequently wasted in the absence of energy storage devices. The use of such energy storage devices in conjunction with optimization is necessary to further reduce energy consumption. Also, locomotive manufacturers are considering locomotives equipped with on-board batteries to store the regenerated energy from batteries.

For example, U.S. Application 20050000386 describes a railway car drive system for accelerating and deaccelerating a train by operating a driving motor, and to improve the power efficiency of the drive system, and recovering the generative power to reduce the load borne by the braking system, and to improve the safety and reliability of the railway car drive system.

U.S. Application 20060005738 describes power generation capability through a traction motor linked to a driving wheel of a train. A controller selectively operates the traction motor in a motoring mode, a coasting mode, or a dynamic braking mode. In the dynamic braking mode, electrical energy is transmitted to an electrical energy storage system. The controller receives control commands from an external control source indicating the operating mode for a particular period of time.

Similarly, U.S. Pat. No. 7,940,016 relates to generative braking methods for a locomotive. Four methods for recovering energy from generative braking and for transferring the energy to energy storage system are disclosed.

U.S. Pat. No. 7,430,967 is concerned with control of locomotive which has on-board energy storage device and can operate either on energy supplied from storage device or from conventional energy sources.

U.S. Pat. No. 7,715,958 relates to the creation of a database of historical information of energy requirements and regenerated energy available from trains along a particular railroad. This historical information is imagined to be used in performing the energy storage control as prediction for future energy demands.

U.S. Pat. No. 8,538,611 describes the multi-level optimization of the railway system such as at the infrastructure, track-level and locomotive level and coordinating amongst the different levels for optimized operation. This work does not consider the case of track-side energy storage devices and coordination of such devices in conjunction For example, the related application Ser. No. 13/803,857 considers the optimization of substation voltages to minimize the energy consumption in railways. Detailed conditional models for voltage controlled substations and decelerating trains were considered.

Accordingly, it is desired to provide a system and a method for optimizing energy consumption so that the total power provided by the grid to the railway system is minimized, while the energy demand of the railway system is satisfied.

SUMMARY OF THE INVENTION

The embodiments of the invention are based on a realization that additionally or alternatively to improving the energy efficiency of the trains individually, the total energy consumption of the railway system can also be optimized. For example, power, generated by regenerative braking, decreases with an increase of the voltage at the braking train. This goes counter to the approach of operating the trains at high voltages. Therefore, the control parameters for the voltages at the power regenerating trains can be optimized to reduce the total energy consumption. Also, when the railway system does not consume all the regenerative power, potentially damaging power surges can occur. Thus, the global optimization can also improve safety in the railway system.

Additionally, there can be mismatch between power regeneration of energy from braking trains and power demand from accelerating trains at certain times. This can result in a decrease of the regenerated energy that is recovered. Installation of energy storage devices such as batteries, flywheels etc. can be utilized to store this excess energy for future use. Further, the location of additional energy storage devices distributed throughout the railway system can act as additional energy sources and reduce any line losses that may occur. Thus, the global optimization in presence of energy storage can increase the recovery of regenerated energy and reduce the line losses resulting in increased system efficiency and reduced energy consumption.

However, the optimization of control parameters controlling at least part of the energy consumption of the railway system has to be performed subject to constraints on various components of the railway system. The constraints of the railway system can include discontinuities, which makes the optimization problem ill-posed. Accordingly, some embodiments of the invention are based on a general realization that for optimization of the control parameters of the railway system, the discontinuities of the constraints have to be reformulated as complementarity constraints. Such reformulation allows using various non-linear optimization solvers.

Additionally, the control of energy storage devices is a challenging task. The challenge stems from the need to weigh the use of energy from such devices at a present time instant to supply power demanding trains that are located far from energy storage incurring significant line losses against the possibly, more efficient usage of such energy in the future when most of the energy from the device is supplied to the power demanding train. Given the uncertainty in the future demands, it is difficult to accomplish this task optimally in a computationally efficient manner.

Accordingly, various embodiments optimize the control parameters of the railway system including energy storage devices subject to the complementarity constraints. Some embodiments use non-linear optimization methods to determine the control parameters. However, due to the limitation on a feasibility region defined by the complementarity constraints, some non-linear optimization methods solve complementarity constraint problem with unacceptably high error rate. Therefore, some embodiments of the invention optimize the control parameters based on iterative relaxation of the complementarity constraint. The iterative relaxation of the complementarity constraint can approximate ill-posed problem as a set of well-posed problems, which increase an accuracy of the solution and reduce computational time.

For example, one embodiment optimizes the control parameters using an interior point method. This embodiment is based on a realization that relaxation of the complementary constraints results in inequality constraints, which is a difficult optimization problem. However, the interior point method can efficiently address the inequality constraints and thus can benefit the iterative relaxation method.

Alternative embodiments are based on a realization that with a reduction of the relaxation parameter, the well-posed problems are progressively transformed into ill-posed problems. Therefore, it is advantageous to reduce the relaxation parameter only when necessary. Thus, one embodiment of the invention optimizes the control parameters iteratively using adaptive modification of a relaxation parameter. In this embodiment, for each iteration, the relaxation parameter is modified only when the complementarity constraint for a current value of the relaxation parameter is violated.

In one embodiment, the complementarity constraint for a substation of the railway system includes a product of a current and an excessive voltage at the substation. The optimization according to this embodiment reformulates the complementarity constraint as an inequality, such that the product of the current and the excessive voltage is less than a relaxation parameter. Next, this embodiment determines the control parameters iteratively based on the inequality, wherein a value of the relaxation parameter is adaptively reduced for subsequent iterations. In one variation of this embodiment, the current iteration includes determining the control parameters based on values of the control parameters determined during a previous iteration. The inequality is tested using values of the control parameters corresponding to that of the current and the excessive voltage of the substation, and the value of the relaxation parameter is modified if the inequality is violated.

In another embodiment, the complementarity constraint for energy storage device includes a product of the charging current flowing into the storage device and the discharging current flowing out of the storage device. The optimization according to this embodiment reformulates the complementarity constraint as an inequality, such that the product of the charging current flowing into the storage device and the discharging current flowing out of the storage device is less than a relaxation parameter. Next, this embodiment determines the control parameters iteratively based on the inequality, wherein a value of the relaxation parameter is adaptively reduced for subsequent iterations. In one variation of this embodiment, the current iteration includes determining the control parameters based on values of the control parameters determined during a previous iteration. The inequality is tested using values of the control parameters corresponding to that of the charging current flowing into the storage device and the discharging current flowing out of the storage device, and the value of the relaxation parameter is modified when the inequality is violated.

Some embodiments combine adaptive relaxation with an interior point method to further optimize the solution. For example, one embodiment determines the relaxation parameter to be proportional to the barrier parameter. This proportionality simplifies determining of the modified value of relaxation parameter in subsequent iterations. This is because the barrier parameters are monotonically decreasing, and when the relaxed complementarity constraint is violated, the relaxation parameter is modified to match appropriately the reduction in barrier parameter.

Accordingly, one embodiment for controlling the energy storage devices uses a form of an objective function that depends on a combination of the energy withdrawn from the substations, state-of-charge of energy storage devices, energy withdrawn from storage devices and energy charged into the energy storage devices. The objective function appropriately reflects the cost for discharging energy from energy devices and reward for charging energy into the storage devices.

Some embodiments, using the objective function, solve an optimization problem over multiple time steps or a single instant to determine the amount of energy to be withdrawn from the storage devices or amount of energy that must be charged into the storage devices.

Accordingly, one embodiment discloses a method for optimizing an energy consumption of a railway system including a set of trains, set of energy storage devices distributed along the railroad and a set of substations connected to a grid for providing power to the set of trains. The method includes optimizing control parameters controlling at least part of the energy consumption of the railway system and energy consumption or replenishment of energy storage devices to produce optimized control parameters minimizing a total power provided by the grid to satisfy a power demand of the railway system, wherein the optimizing is subject to constraints on operations over one time-instant or multiple time instants of the railway system including energy storage devices, the constraints include a complementarity constraint; and generating a command to control the energy consumption of the railway system based on the optimized control parameters. Steps of the method are performed by a processor.

Another embodiment discloses a system for optimizing an energy consumption of a railway system including a set of trains, set of energy storage devices distributed along the railroad and a set of substations connected to a grid for providing power to the railway system. The system includes a processor for optimizing control parameters controlling at least part of the energy consumption of the railway system and energy consumption or replenishment of energy storage devices, such that a power demand of the railway system is satisfied and a total power provided by the grid is minimized, wherein the optimizing is subject to constraints on operations over one time-instant or multiple time instants of the trains, energy storage devices and constraints on operations of the substations, wherein the constraints on the operations of the substations include a complementarity constraint, wherein the processor optimizes the control parameters based on a relaxation of the complementarity constraint.

Another embodiment discloses a system for optimizing an energy consumption of a railway system including a set of trains, set of energy storage devices distributed along the railroad and a set of substations connected to a grid for providing power to the railway system. The system includes a processor for optimizing control parameters controlling at least part of the energy consumption of the railway system and energy consumption or replenishment of energy storage devices, such that a power demand of the railway system is satisfied and a total power provided by the grid is minimized, wherein the optimizing is subject to constraints on operations over one time-instant or multiple time instants of the trains, substations and constraints on operations of the energy storage devices, wherein the constraints on the operations of the energy storage devices include a complementarity constraint, wherein the processor optimizes the control parameters based on a relaxation of the complementarity constraint.

Following is a summary of variables, terms and notations used in the detailed description below.

| | |
|---|---|
| N | set of nodes in the network |
| $N^F$ | subset of nodes in the network corresponding to substations |
| $N^A$ | subset of nodes in the network corresponding to power consuming trains |
| $N^R$ | subset of nodes in the network, corresponding to regenerative trains |
| $N^S$ | subset of nodes corresponding to energy storage devices |
| $r_i^L$ | resistance on the electrical line joining node i and i + 1 |
| $r_i^F$ | internal resistance associated with substation i |
| $V_{min}^F$ | minimal voltage at substation |
| $V_{max}^F$ | maximal voltage at substation |
| $V_{min}^R$ | minimal voltage at regenerative trains |
| $V_{max}^R$ | maximal voltage at regenerative trains |
| $P_{max}^R$ | maximal power that can be produced by regenerative trains |
| $V_{min}^S$ | minimal voltage at storage devices |
| $V_{max}^S$ | maximal voltage at storage devices |
| $I_{max}^c$ | maximal charging current into the storage devices |
| $I_{max}^d$ | maximal discharging current from the storage devices |
| $SOC_{min}$ | minimal state-of-charge at storage devices |
| $SOC_{max}$ | maximal state-of-charge at storage devices |
| $Q_i$ | capacity of storage device connected to node i |
| $\eta_i$ | efficiency of power converter module in energy storage device connected to node i |
| $R_i$ | internal resistance associated with energy storage device |
| $V_i$ | voltage at node i |
| $I_i$ | current supplied to network from node i |
| $I_i^l$ | current flowing between nodes i and i + 1 |
| $P_i^A$ | specified power consumed by accelerating or coasting trains |
| $P_i^R$ | power produced by the regenerative trains |
| $V_{ter,i}$ | voltage at the converter on the battery side in the energy storage device at node i |
| $V_{bat,i}$ | voltage at the battery in the energy storage device at node i |
| $I_{bat,i}^c$ | charging current into the battery at node i |
| $I_{bat,i}^d$ | discharging current from the battery at node i |
| $I_i^c$ | charging current into the storage device from the electrical lines at node i |
| $I_i^d$ | discharging current from the storage device at node i |
| V | set of voltages at the nodes |
| $V_{bat}$ | set of voltages at the batteries located at storage device nodes |
| $V_{ter}$ | set of voltages at the converter located at storage device nodes |
| I | set of currents supplied to the network from the nodes |
| $I^L$ | set of currents in the DC network |
| $I^c$ | set of charging currents into the storage device |
| $I^d$ | set of discharging currents from the storage device |
| $I_{bat}^c$ | set of charging currents into the battery |
| $I_{bat}^d$ | set of discharging currents from the battery |
| $P^R$ | set of power supplied to the DC network by regenerative trains. |
| SOC | set of state-of-charge for batteries in the energy storage devices. |

BRIEF DESCRIPTION OF THE DRAWING

FIG. 4A is a plot of feasible values of voltages for given currents at substations of the railway system according to one embodiment of the invention;

FIG. 4B is a plot of relationship of voltage and current for power consuming trains in the railway system according to one embodiment of the invention;

FIG. 4C is a plot of relationship of voltage and current for regenerative trains in the railway system according to one embodiment of the invention;

FIG. 6 is a schematic of a method for optimizing energy consumption of the railway system according to some embodiments of the invention;

FIGS. 7 and 8 are schematics of relaxation of the complementarity constraints by multiple parameters according to one embodiment of the invention;

FIG. 9 is a pseudocode of the method for complementarity inequality reformulation according to one embodiment of the invention.

FIG. 10 is a schematic of another method according another embodiment of the invention;

FIG. 12 shows a pseudocode for solving the barrier problem with adaptive relaxation according to one embodiment of the invention.

DETAILED DESCRIPTION OF THE PREFERRED EMBODIMENTS

Railway System

The embodiments of the invention optimize an energy consumption of a railway system that includes a set of trains, set of energy storage devices and a set of substations. The substations are connected to a grid and provide power to the set of trains. The set of energy storage devices are located along the length of the railroad and are connected to the overhead electrical lines that supply power to the trains. Optimizing energy consumption includes minimizing the amount of power supplied to the railway system from the grid. The embodiments can reflect, in real-time, dynamically varying states of the railway system, in terms of locations and identifications of substation, energy storage devices and trains, and measured electrical characteristics such voltages, currents, and resistances in power lines of DC network connecting the substations, energy storage devices and trains.

Figure 1:
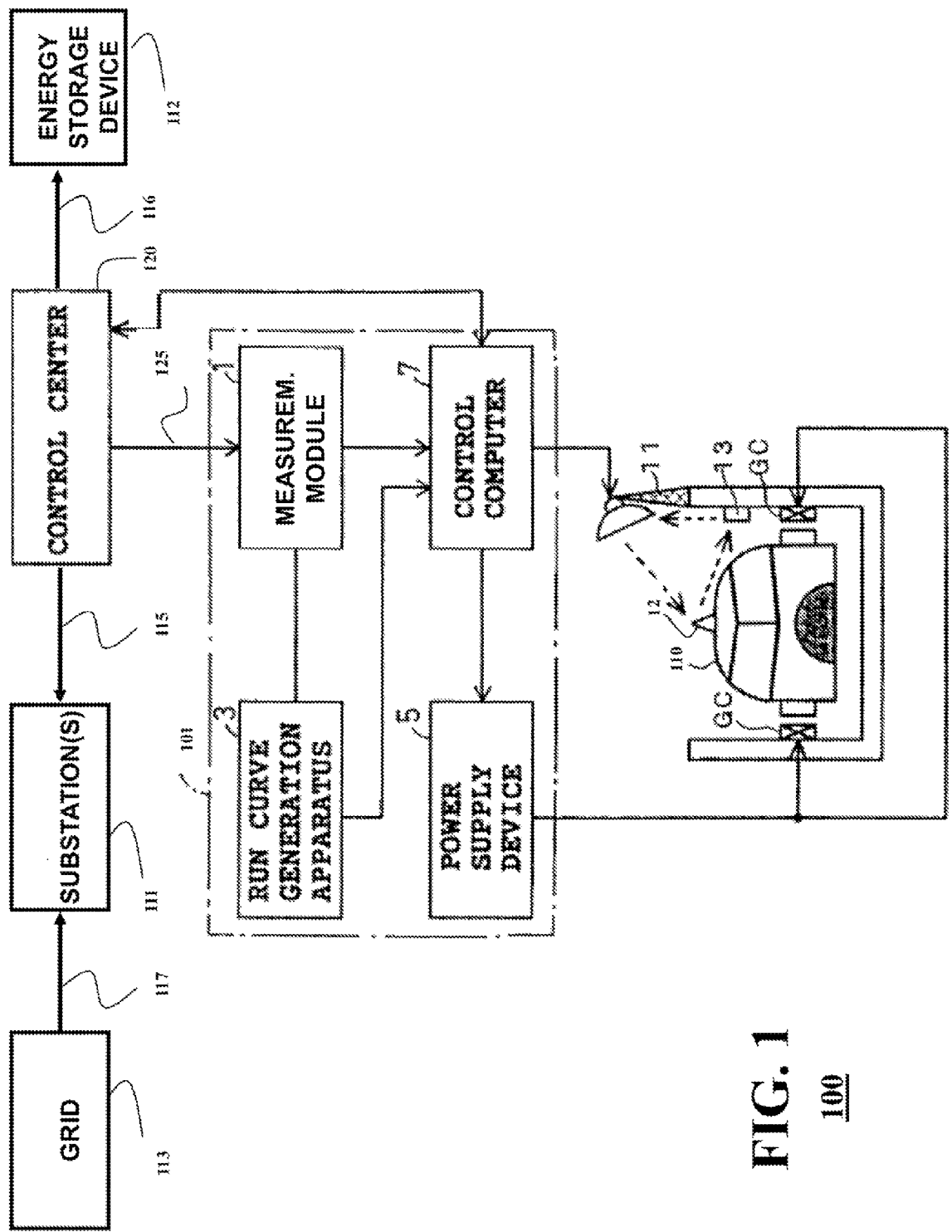
FIG. 1 is a schematic of a railway system according to some embodiments of the invention.

FIG. 1 show a railway system according to some embodiments of the invention. The railway system includes a set of trains, such as a train 110, a set of substations 111 and a set of energy storage devices 112. The train 110 can be an electrical train, wherein the electric power is converted and supplied to feeders or ground coils (GC) via breakers. The train can use regenerative braking to generate energy. The energy can be stored in the power supply device 5, stored in the energy storage devices 112 or distributed to other trains in the railway system.

A control system 101 of the train 110 can include one or combination of a measurement module 1, a run curve generation apparatus 3, a power supply device 5, and a control computer 7. The control system determines the state of the train. The state can include locations and the power demands of the trains. The state can also include positions and velocities of the trains and next actions of the trains. The state can be determined by one or combination of the control computer 7 and the measurement module 1. For example, the state can be defined by run curve of the train determined by the run curve generation apparatus. The run curve can be updated based on the measurements determined by the measurement module 1. For example, the measurements module can includes a GPS unit for determining the location of the train. The measurement module can also include an energy meter for measuring a power demand or a power excess of the train.

The implementation of the control system can be performed within the circuits of the train, in a remote control center 120, and/or can be distributed between the vehicle and the control center. The communications between the vehicle and the control center can be achieved using wireless transceivers 11-13. Various components and modules of the control system and control center can be implemented using a processor.

In various embodiments, the control center is also connected to the substations 111, energy storage devices 112 and to the grid 113. The control center optimizes control parameters controlling at least part of the energy consumption of the railway system to produce optimized control parameters minimizing a total power 117 provided by the grid 113 to satisfy a power demand of the railway system. The control center generates commands 115, 116 and/or 125 to control the energy consumption of the railway system based on the optimized control parameters. For example, the control parameters can include values of voltages and currents at each substation, energy storage device and each train, the amount of currents withdrawn from or injected into the energy storage devices.

Figure 2:
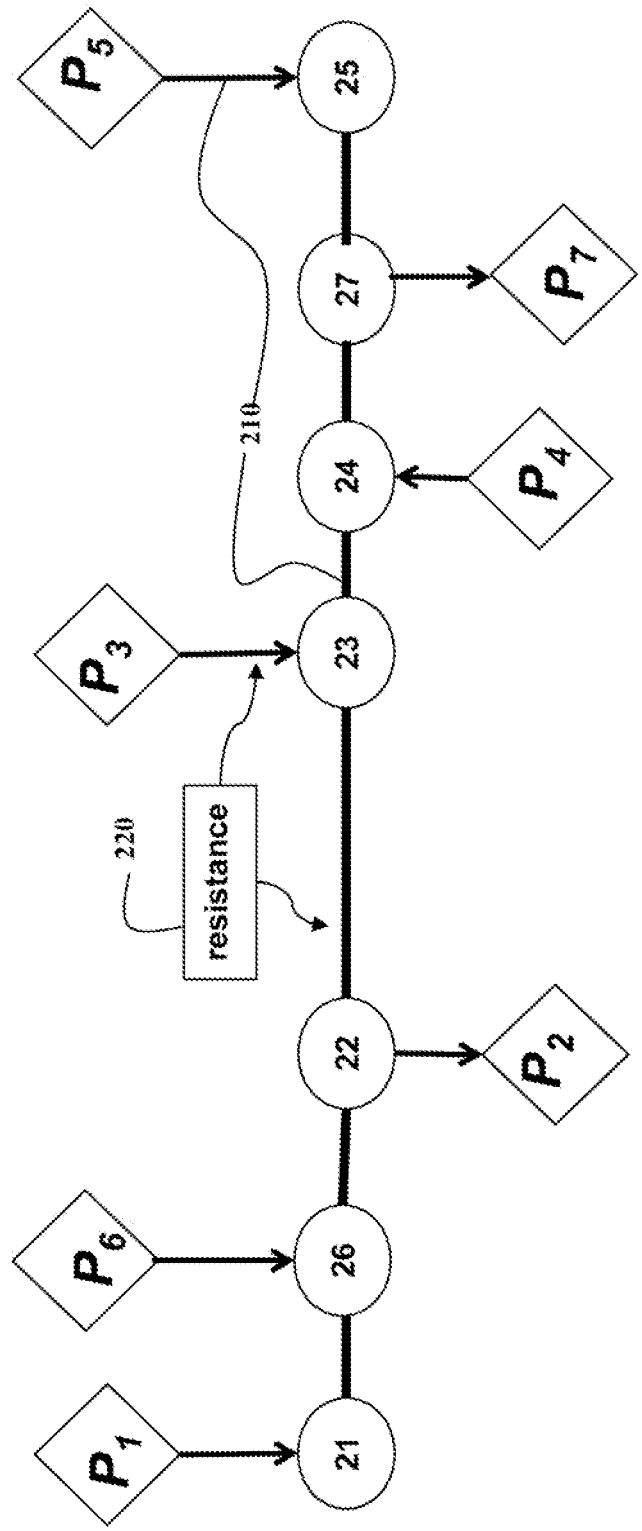
FIG. 2 is graphical representation the railway system.

FIG. 2 shows an example of the railway system represented as a graph 200. The graph includes nodes 21, 23 and 25 representing a set of substations receiving power $P_1$, $P_2$ and $P_5$ from an electric grid, node 26 representing a storage device that is injecting power $P_6$ into electrical lines and node 27 representing a storage device that is receiving power $P_7$ from the electrical line, a node 22 representing a set of power consuming trains $P_3$, and a node 24 representing a set of power generating trains $P_4$. The edges joining the nodes represent power lines 210 in the DC network connecting the substations, storage devices and the trains. Resistance 220 of the power lines is typically known. Additional substations, storage devices and trains can be incorporated into the graph to represent practical railway systems.

Optimization Method

The embodiments of the invention are based on a realization that additionally or alternatively to improving the energy efficiency of the trains individually, the total energy consumption of the railway system can also be optimized. For example, power, generated by the regenerative braking, decreases with an increase of the voltage at the braking train. This goes counter to the approach of operating the trains at high voltages. Therefore, the control parameters for the voltages at the power regenerating trains can be optimized to reduce the total energy consumption. Also, if the railway system does not consume regenerative power, potentially damaging power surges can occur. Thus, the global optimization can also improve safety in the railway systems.

Additionally, there can be mismatch between power regeneration of energy from braking trains and power demand from accelerating trains at certain times. This may result in decrease of the regenerated energy that is recovered. Installation of energy storage devices, such as batteries, flywheels, etc. can be utilized to store this excess energy for future use. Furthermore, the location of additional energy storage devices distributed along the length of the railroad can act as additional energy sources and reduce the line losses that occur. Thus, the global optimization in the presence of energy storage can increase the recovery of regenerated energy and reduce the line losses resulting in increased system efficiency and reduced energy consumption.

However, the optimization of control parameters controlling at least part of the energy consumption of the railway system has to be performed subject to constraints on various components of the railway system. The constraints of the railway system can include discontinuities, which makes the optimization problem ill-posed. Accordingly, some embodiments of the invention are based on a general realization that for optimization of the control parameters of the railway system, the discontinuities of the constraints have to be reformulated as complementarity constraints. Such reformulation enables using various non-linear optimization solvers.

Additionally, the control of energy storage devices is a challenging task. The challenge stems from the need to weigh the use of energy from such devices at the present time instant to supply power demanding trains that are located far from energy storage incurring significant line losses against the possibly, more efficient usage of such energy in the future when most of the energy from the device is supplied to the power demanding train. Given the uncertainty in the future demands it is unclear how such a task can be accomplished optimally and computationally efficient manner.

Figure 3:
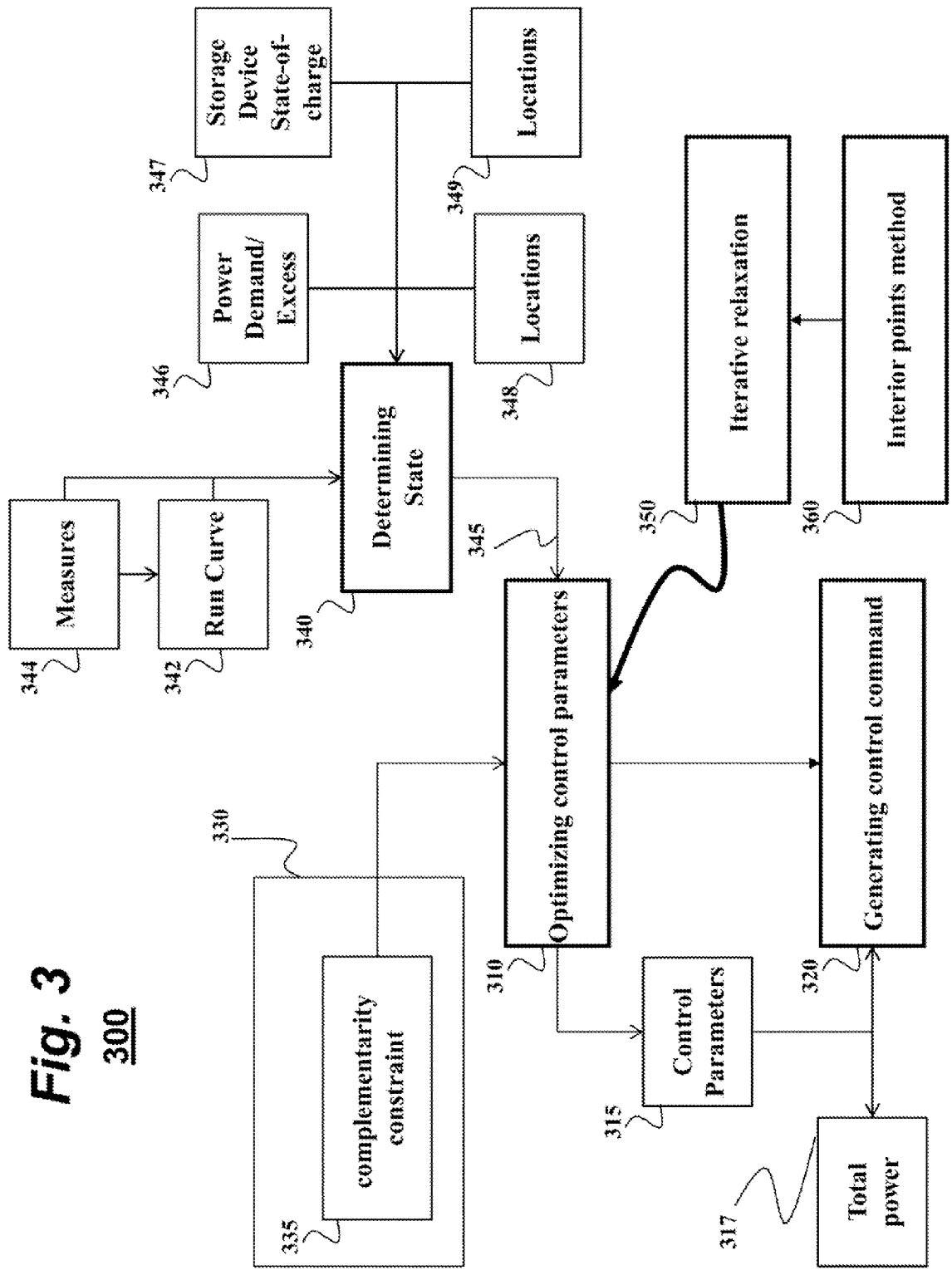
FIG. 3 is a block diagram of a method for optimizing an energy consumption of the railway system according to one embodiment of the invention.

FIG. 3 shows a block diagram of a method for optimizing an energy consumption of a railway system including a set of trains and a set of substations connected to a grid for providing power to the set of trains. The set of trains can include a set of power consuming trains and a set of power regenerating trains.

The inputs to the method can include one or combination of a description of the substations, the energy storage devices, the power consuming trains and the power generating trains. The description can include one or combination of an identification, location and power consumption and power generation related information, in general the state of the railway. The output of the method can include optimal power related quantities at the substations, energy storage devices, particular the amount of power charged into devices and amount of energy withdrawn from devices and trains, particular the amount of power regenerated by deaccelerating trains and fed back to the substations.

The method optimizes 310 control parameters controlling at least part of the energy consumption of the railway system to produce optimized control parameters 315 minimizing a total power 317 provided by the grid to satisfy a power demand of the railway system. For example, the control parameters can include values of voltages and currents for each substation and for each train. Next, a command to control the energy consumption of the railway system based on the optimized control parameters is generated 320. The steps of the method can be performed by a processor 300.

The optimization 310 is subject to constraints 330 on operations of the railway system. The constraints include, e.g., constrains on operation of the trains and constraints on operation of the substation. In various embodiments, the constraints include a complementarity constraint 335. The complementarity constraints 335 allow solving the optimization problem subject to discontinuity constraints typically imposed on the railway systems.

For example, in one embodiment, the complementarity constraint includes a product of a current at a substation and an excessive voltage at the substation. This formulation allows transforming discontinuities of the constraint of the substation into the complementarity constraints, which, respectfully, reformulates optimization subject to discontinuity constraints into optimization subject to complementarity constraints.

In another embodiment, the complementarity constraint for energy storage device includes a product of the charging current flowing into the storage device and the discharging current flowing out of the storage device. This ensures that each storage device operates in exactly one of state of charge or discharge but not both.

In some embodiments, the method optimizes the control parameters based on a state 345 of railway system. The state can be determined 340 at a particular time, and can include location 348 of the trains, the power demand 346 of the power consuming trains, and/or power excess of the power regenerating trains, location 349 of energy storage devices and state-of-charge of energy storage devices 347. For example, a total power demand of the railway system can be determined based on states of each train of the railway system, e.g., by subtracting the power excess of the train from the power demand of the trains and considering energy loses based on resistance of the power lines. In one embodiment, the method determines the state based on run curves 342 of the trains. The usage of the run curves allows avoiding or minimizing real time measurements in the railway system, which can be expensive. Additionally, one embodiment modifies the determined state based on measurements 344 of the state at the point of time, which can improve the accuracy of the determination of the state while minimizing the amount of measurements.

The method can be performed repeatedly to dynamically determine a state of operation of the railway system, and optimize power usage accordingly. For example, the optimization is performed every five seconds or less. In addition, the processing can be performed in a distributed manner, e.g., at the substations and/or at trains.

The method can take as input various measurements of electrical conditions, and dynamically changing configuration of the railway system as the trains move. The conditions are constrained as described below. The input can be transformed to determine a state of the railway system based on the sensed data using, for example a supervisory control and data acquisition (SCADA) system.

Substations

FIG. 4A shows feasible values 410 of voltages as a function of currents at substations. As defined herein, feasible means capable of being according to, e.g., a feasible plan.

If no current is consumed, then the entire voltage axis above $V_{min}^F$ is feasible. The substations receive power from an external electric grid and power the trains. A voltage and current model for substation i is $$V_i \in \begin{cases} [V_{min}^F, V_{max}^F - r_i^F I_i] & \text{if } I_i > 0 \\ [V_{min}^F, \infty) & \text{if } I_i = 0 \end{cases} \forall i \in N^F, I_i \geq 0 \quad (1)$$

where $V_i$ is the voltage, $I_i$ is the current supplied, $V_{min}^F, V_{max}^F$ are minimal, maximal operational voltages, and $r_i^F$ is the internal resistance at the substations.

In one embodiment, a non-negativity requirement on the current $I_i$ ensures that the substation does not feed power back to the electric grid if the DC network does not include an inverter. This restriction reflects the problem instances that are considered, and is not a limitation for other embodiments. However, if the DC network cannot consume all the regenerative power, potentially damaging power surges can occur.

The voltage at the substation has a discontinuity 420 at current $I_i=0$ 430. In other words, there is an upper limit on the voltage $V_i$ when power is consumed from the substation. There are no upper limits when power is not consumed from the substation. Discontinuities are not desirable for well-posed nonlinear programs (NLP), which assume differentiability of functions and constraints.

Therefore, various embodiments reformulate the model of Eqn. (1) using complementarity constraints, $$\left. \begin{array}{l} V_i \leq V_{max}^F - r_i^F I_i + \alpha_i \\ V_i \geq V_{min}^F \\ I_i, \alpha_i \geq 0, I_i \alpha_i = 0. \end{array} \right\} \forall i \in N^F, \quad (2)$$

where a product of a current at a substation $I_i$ and an excessive voltage at the substation $\alpha_i$ is zero. This constraint is precisely a complementarity constraint, which requires that at any feasible solution either $I_i$ or $\alpha_i$ vanishes. The value $\alpha_i$ is a measure of a maximum voltage violation at a feeding substation.

Consequently, when $I_i>0$, the scalar $\alpha_i=0$ and the upper bound of $V_{max}^R - r_i^F I_i$ are imposed on the voltage. When $I_i=0$, the scalar $\alpha_i \geq 0$ can be positive to allow the voltage to exceed $V_{max}^F$. The above constraints are differentiable. Hence, the complementarity constraints enable us to model the otherwise unsmooth substation behavior using smooth constraints.

Power Consuming Trains

FIG. 4B shows the relationship 440 of voltage and current for power consuming trains ($i \in N^A$). The power $P_i^A$ consumed by each of these trains can be expressed as $$\left. \begin{array}{l} V_i I_i = -P_i^A \\ I_i \leq 0 \end{array} \right\} \forall i \in N^A. \quad (3)$$

A non-positivity bound on the current ensures that only these trains consume power.

Regenerative Trains

FIG. 4C shows the relationship 450 of voltage and current for the regenerative trains (R). The regenerative trains ($i \in N^R$) can supply power generated from braking to the DC network. The amount of generated power is $$\left. \begin{array}{l} P_i^R \leq \begin{cases} P_{max}^R & \text{if } V_i \leq V_{min}^R \\ P_{max}^R \frac{V_{max}^R - V_i}{V_{max}^R - V_{min}^R} & \text{if } V_{min}^R \leq V_i \leq V_{max}^R \end{cases} \\ P_i^R \geq 0 \\ P_i^R = V_i I_i \\ I_i \geq 0 \end{array} \right\} \forall i \in N^R, \quad (4)$$

where $P_{max}^R$ is the maximal power that is available from the regenerative train, and $V_{min}^R, V_{max}^R$ are bounds on the voltages. The amount of power that can be recovered is greatest when the voltage at the train is less than $V_{min}^R$. At higher voltages, the amount of power available for recovery decreases linearly with increasing voltage $V_i \geq V_{min}^R$. For voltages higher than $V_{max}^R$, power is not available from the regenerative trains.

Energy Storage Devices

Figure 5A:
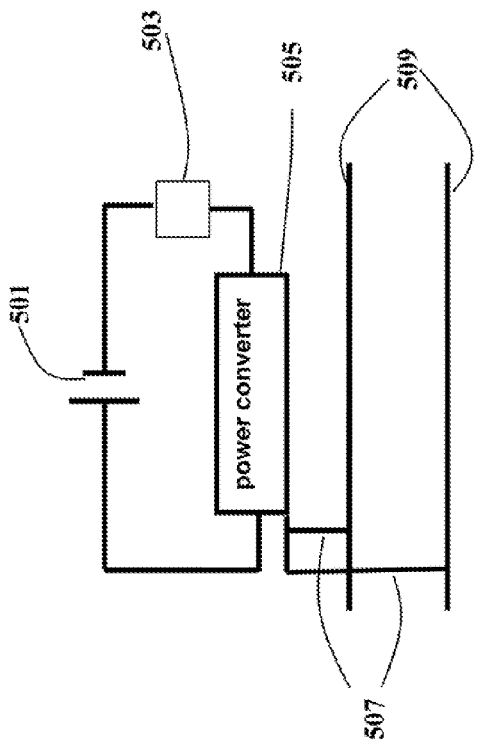
FIGS. 5A, 5B and 5C are examples of the optimization subject to complementarity constraints using the relationships of various measurements of voltages, currents, resistances at nodes in the railway system according to one embodiment of the invention.

In one embodiment the energy storage device is modeled as in FIG. 5A. The device consists of a storage device and power converter module. The energy storage device consists of a battery 501 with an internal resistance 503. The battery is connected to a power converted module 505. The power converter module is connected to the electrical lines 509 through connection 507.

Figure 5C:
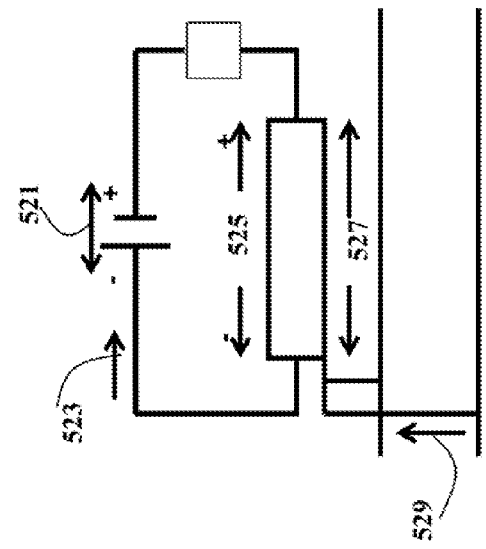
Figure 5B:
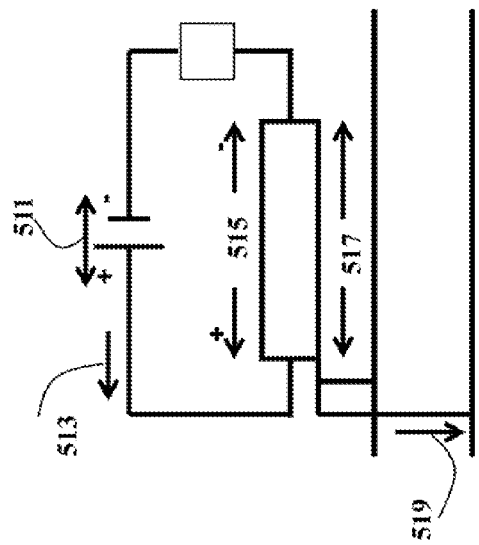

FIG. 5B shows the current flow in the device when the battery is discharging power into the electrical lines. The voltage across the battery 511 and the current flowing from the battery is 513. The voltage 515 across the power converted module is lower than that at the battery due to the internal resistance. The voltage 517 that is seen on the electrical line is lower than that across the power converter module due to the inefficiencies in the conversion process. The current flowing on to the lines is 519.

FIG. 5C shows the current flow in the device when the battery is charging using current from the electrical lines. The voltage across the battery 521 and the current flowing into the battery is 523. The voltage 525 across the power converted module is higher than that at the battery due to the internal resistance. The voltage 527 that is seen on the electrical line is higher than that across the power converter module due to the inefficiencies in the conversion process. The current flowing from the lines is 529. The mathematical model of such an energy storage device is given by, $$\left. \begin{array}{l} V_{min}^S \leq V_i \leq V_{max}^S \\ -I_{max}^c \leq I_i \leq I_{max}^d, -I_{max}^c \leq I_{bat,i} \leq I_{max}^d \\ SOC_{min} \leq SOC_i \leq SOC_{max} \\ SOC_i(k+1) = SOC_i(k) - \dfrac{I_{bat,i}(k)\Delta t}{Q_i} \\ V_{ter,i} = V_{bat,i} - I_{bat,i}^d R_i + I_{bat,i}^c R_i \\ V_i I_i^d = \eta V_{ter,i} I_{bat,i}^d \\ \eta_i V_i I_i^c = V_{ter,i} I_{bat,i}^c \\ V_{bat,i} = \text{constant} \\ I_{bat,i} = I_{bat,i}^d - I_{bat,i}^c \\ I_{bat,i}^d \geq 0, I_{bat,i}^c \geq 0, I_{bat,i}^d I_{bat,i}^c = 0 \\ I_i = I_i^d - I_i^c; I_i^d, I_i^c \geq 0 \end{array} \right\} \forall i \in N^S$$

where, $V_{min}^S, V_{max}^S$ are the minimum and maximum voltages at the connection point of the energy storage device to the electrical lines, $I_{max}^c, I_{max}^d$ are the maximum charging and discharging currents, $SOC_{min}, SOC_{max}$ are the minimum and maximum state of charge for the batteries, $R_i, Q_i$ are the internal resistance and capacity of the battery, $\eta_i$ is the efficiency of the power converter module, k is the time index, $\Delta t$ is the time-step, In another embodiment, the energy storage device is modeled using a simple ideal model as $$V_{min}^S \leq V_i \leq V_{max}^S \quad (5)$$
$$-I_{max}^c \leq I_i \leq I_{max}^d$$
$$SOC_{min} \leq SOC_i \leq SOC_{max}$$
$$SOC(k+1) = SOC_i(k) - \dfrac{I_i(k)V_i(k)\Delta t}{Q_i}$$

Choice of Objective Function

The primary motivation of the substation voltage control and use energy storage devices is to reduce the consumption of power from the substations that are connected to the grid. Due to the presence of batteries the optimization problem considered spans several time-steps of operation into the future. The objective function is of the form, $$\sum_{t=k}^{k+T} \sum_{i \in N^G} V_i(t) I_i(t) + \sum_{i \in N^S} f_S(V_i(t), I_i^c(t), I_i^d(t), SOC_i(t)). \quad (6)$$

In the preferred embodiment, the function $f_S$ is defined as follows, $$f_S(V_i(t), I_i^c(t), I_i^d(t), SOC_i(t)) = V_i(k)[w_d I_i^d(t) - w_c I_i^c(t)], \quad (7)$$

where $I_i^c(t), I_i^d(t)$ are positive weights multiplying the discharge current from the storage device and charge current into the storage device respectively. The weights can change over time.

FIG. 6 shows an example of the optimization 610 subject to complementarity constraints using the relationships 620 of various measurements of voltages, currents, resistances at nodes in the railway system 100. Notably, the optimization ensures that the voltages are within minimal and maximal limits. Also, the optimization problem occurs over multiple time steps t=k, . . . , k+T. In this problem, the power that will be required for the trains in the future requires prediction of the future locations of the trains and power demands, power regeneration levels of all trains.

Choice of Time Horizon for Optimization

The choice of time horizon for optimization is not straight forward. Longer the horizons allow the solution of finite horizon optimization problem to approach the infinite horizon optimal. But the uncertainty in predicting the future states of the trains and the increase in the computational requirement as the time-horizon increases make this prohibitive.

In the preferred embodiment, the optimization problem is solved over a single time instant. The objective function $f_s$ is chosen to reflect the costs over an infinite time horizon.

Complementarity Constraints

Figure 7:
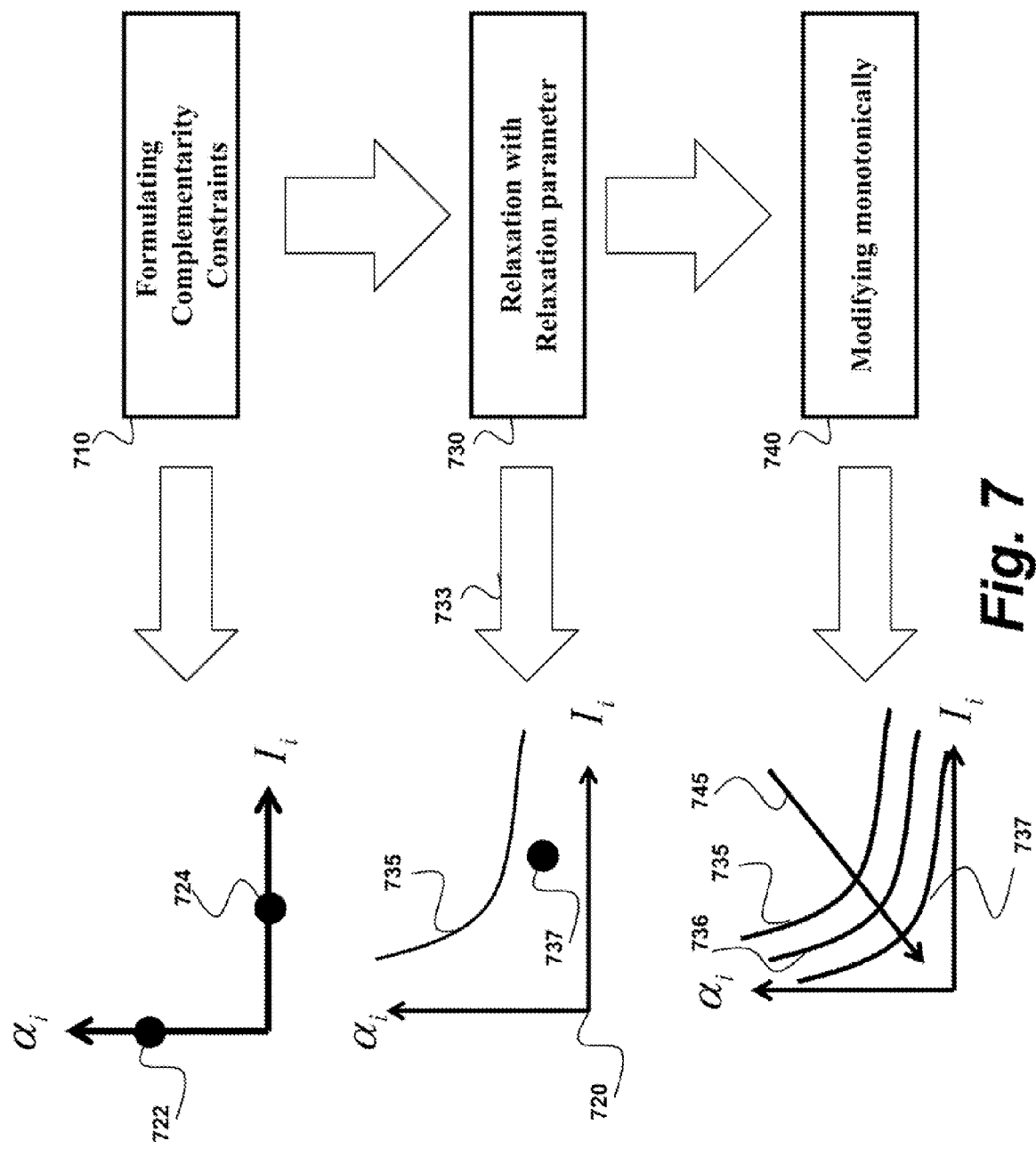

FIG. 7 shows a schematic of a method for optimizing energy consumption of the railway system according to some embodiments of the invention. The optimization of the energy consumption is formulated 710 subject to complementarity constraints. The example of such formulation is optimization 610 of FIG. 6.

The plot 720 shows a feasible region of points representing the solution satisfying the complementarity constraints. In the plot 720, feasible points are on one of the axes. For example, the feasible points include a feasible point 722, i.e., $I_i=0$, or a feasible point 724, i.e., $\alpha_i=0$.

Some embodiments use non-linear optimization methods to determine the control parameters. However, due to the limitation on the feasibility region defined by the complementarity constraints, some non-linear optimization methods solve complementarity constraint problem with unacceptably high error rate. For example, interior point methods, which are routinely used for solving nonlinear programs, require (i) strictly feasible interior, and (ii) gradients of active constraints that are linearly independent. However, the complementarity constraint problem is degenerated and not well suited for solving by interior point algorithms.

Based on this realization, some embodiments of the invention optimize the control parameters based on iterative relaxation of the complementarity constraint. The iterative relaxation of the complementarity constraint can approximate ill-posed problem as a set of well-posed problems, which increase accuracy of the solution and reduce computational time.

Accordingly, some embodiments relax 730 the feasibility region with relaxation parameter, e.g., μ>0 735. The relaxation parameter 733 defines the curve 735 such that feasible points of the solution lie between the axis 720 and the curve 735. There exists a strictly feasible interior point 737, and the problem is well-posed.

The optimization using relaxation of the complementarity constraint is solved iteratively. In one embodiment, the relaxation parameter is modified monotonically 740 forming, e.g., the curves 735-737. For example, the interior point method iteratively reduces 745 value of μ to zero. As μ approaches zero, the method recovers the complementarity constraints. This yields strictly a feasible interior for some complementarity constraints even as μ approaches zero, with a better performance. Specifically, approximating ill-posed problem as a set of well-posed problems increases accuracy of the solution and reduces computational time. Below are the various method used by some embodiments of the invention for solving a program with complementarity constraint.

Mathematical Program with Complementarity Constraints (MPCC)

In one embodiment, the optimization problem is formulated as $$\min obj_F = \sum_{t=k}^{k+T} \sum_{i \in N^G} V_i(t) I_i(t) + \sum_{i \in N^S} f(SOC_i(t), V_i(t), I_i^c(t), I_i^d(t)) \quad (8)$$

s.t. $V_i(t) - V_{i+1}(t) = r_i I_i^L(t) \forall i \in N, t = k, \ldots, k+T$ $I_1(t) = I_1^L(t) \forall t = k, \ldots, k+T$ $I_i^L(t) + I_i(t) = I_{i+1}^L(t) \forall i \in N, t = k, \ldots, k+T,$ Substation model in (2) $\forall t = k, \ldots, k+T$
Accelerating train model in (3) $\forall t = k, \ldots, k+T$
Decelerating train model in (4) $\forall t = k, \ldots, k+T$
Storage device model in (5) $\forall t = k, \ldots, k+T$ $SOC_i(k)$=given, $\forall i \in N^S$ where, T is the number of time steps in the optimization and T is the current time instant index.

In the above formulation (8), the optimization is formulated as a minimization of the sum of the power ($\Sigma V_i I_i$) supplied by the electric grid and the amount of power charged into and amount of energy withdrawn from energy storage devices ($\Sigma f_S(SOC_i, V_i, I_i)$). The constraints include the voltage drop due to the resistance in the lines connecting the nodes, the need to balance current flowing on these lines, and the constraints as in Eqns. (2-5). The formulation above assumes the DC network is represented by a line graph for ease of illustration. This is not a restriction of the approach and it can accommodate more general graph representations.

Because the embodiment uses the complementarity formulation of Eqn. (2) for the substations, the above problem is an instance of MPCC. The MPCC is a class of nonlinear programs (NLPs) that includes complementarity constraints.

For any MPCC, a Linear Independence Constraint Qualification (LICQ) fails to hold at any feasible point. LICQ is typically assumed at a solution point of a NLP, and this ensures uniqueness of multipliers. The lack of this property implies that the multiplier set is not unique at a minimizer of the MPCC. Furthermore, the failure of LICQ at any feasible point implies difficulty in step calculation as the Newton system is singular. Furthermore, there is no strict interior for the feasible region. This implies the failure of a weaker Mangasarian Fromovitz Constraint Qualification (MFCQ). The failure of MFCQ renders the multiplier set unbounded at the solution.

Interior point methods can solve large-scale inequality constrained NLPs. Interior methods require a strictly feasible interior for the constraint set of the NLP. The lack of strict interior also makes it difficult to apply interior point methods to MPCC. However, the complementarity constraints can be reformulated to allow a strictly feasible interior to which interior point methods can be applied.

Interior Point Method

Some embodiments of the invention are based on a realization that approximation reformulates complementarity constraints as inequality constraints. Optimization under inequality constraints is a difficult optimization problem. However, the interior point method was designed for inequality constraints, and thus, advantageously used in the iterative relaxation method.

For example, some embodiments use at least two reformulations of the MPCC, which enable interior point methods to be applied. For the purposes of brevity, we express the MPCC in Eqn. (8) as, $$\min f(V, I, I^c, I^d, SOC)$$

$$s.t. h(V, V_{bat}, V_{ter}, I, I^L, I^c, I^d, I_{bat}^c, I_{bat}^d, \alpha, SOC) = 0$$

$$g(V, V_{bat}, V_{ter}, I, I^c, I^d, I_{bat}^c, I_{bat}^d, SOC) \leq 0, \quad (9)$$

$$I_i, \alpha_i \geq 0, I_i \alpha_i = 0 \forall i \in N^F$$

$$I_{bat,i}^c, I_{bat,i}^d \geq 0, I_{bat,i}^c I_{bat,i}^d 0 \forall i \in N^S$$

where $V=(V_1, \ldots, V_{|N|})$ and $I=(I_1, \ldots, I_{|N|})$ are sets of voltages and currents supplied to the DC network by the electric grid and the generating trains and withdrawn by the consuming trains at the N nodes, $V_{bat}=(BV_{bat,i})_{i \in N^S}$ is the set of voltages at the battery in the energy storage devices, $V_{ter}=(V_{ter,i})_{i \in N^S}$ is the voltage on the battery side of the power converter modules in the energy storage devices, $I^L=(I_1^L, \ldots, I_{|N|-1}^L)$ is the set of currents between the nodes, $SOC=(SOC_i)_{i \in N^S}$ is the set of state-of-charge for energy storage devices, $I^c=(I_i^c)_{i \in N^S}$ is the set of charging currents for the energy storage devices, $I^d=(I_i^d)_{i \in N^S}$ is the set of discharging currents for the energy storage devices, $I_{bat}^c=(I_{bat,i}^c)_{i \in N^S}$ is the set of charging currents for the battery in energy storage devices, $I_{bat}^d=(I_{bat,i}^d)_{i \in N^S}$ is the set of discharging currents for the battery in energy storage devices, and $\alpha=(\alpha_i)_{i \in N^F}$ is the set of variables denoting an amount by which the substation voltages exceed an operational maximal at the substations.

The function h denotes the set of real equality constraints in Eqn. (8), with the exception of the complementarity constraints, the function g represents the inequality constraints in Eqn. (8) with the exception of bounds on $I_i, \alpha_i$ for $i \in N^F$, and also the bounds on $I_{bat,i}^c, I_{bat,i}^d$ for $i \in N^S$ and $f$ represents the objective function in Eqn. (8).

The interior point method applied according to Eqn. (9) solves the following equality constrained problem. The problem is obtained by posing the inequality constraints in the objective function with a barrier term $$\min f(V, I, I^c, I^d, SOC) - \qquad (10)$$
$$\mu \left( \sum_{i \in N^F} \ln(I_i) + \ln(\alpha_i) \right) - \mu \left( \sum_{i \in N^S} \ln(I_i^c) + \ln(I_i^d) \right)$$
$$\text{s.t. } h(V, V_{bat}, V_{ter}, I, I^L, I^c, I^d, I^c_{bat}, I^d_{bat}, \alpha, SOC) = 0$$
$$g(V, V_{bat}, V_{ter}, I, I^c, I^d, I^c_{bat}, I^d_{bat}, SOC) + s = 0$$
$$I_i \alpha_i = 0 \forall i \in N^F$$
$$I^c_{bat,j} I^d_{bat,j} = 0 \forall i \in N^S,$$

where $\mu > 0$ is the barrier parameter, and s are slack variables for the inequality constraints g. In an optimization problem, a slack variable is a variable that is added to an inequality constraint to transform it to an equality. Barrier methods are an alternative for constrained optimization. Barrier methods use the barrier parameter to force the iterates to remain interior to the feasible domain, and biases the iterates to remain away from the boundary of the feasible region.

Conceptually, the interior point method starts from a high barrier value of $\mu > 0$, and solves a sequence of problems of Eqn. (10) for decreasing values of $\mu$. An initial iterate, such that s>0, is $I_i \alpha_i > 0 \forall i \in N^F, I_{bat,i}^c I_{bat,i}^d > 0 \forall i \in N^S$. The barrier parameter iterates in interior of the nonnegative orthant (hyperoctant) as the objective approaches infinity on the boundary. However, as $\mu$ decreases, the iterates are allowed to approach the boundary of the orthant, thus recovering a solution that lies at the bounds. In the limit, under certain assumptions, the sequence of solutions for different, $\mu$ approaches the solution of Eqn. (6). However, in the case of MPCCs, there are no $\alpha_i$, $I_i$, $I_{bat,i}^c$, $I_{bat,i}^d > 0$ that are feasible in Eqn. (10).

Penalty Reformulation

In this embodiment, the complementarity constraints in Eqn. (8) are penalized in the objective function as $$f_\pi h(V, I, I^c, I^d, I^c_{bat}, I^d_{bat}, SOC) := \qquad (11)$$
$$f(V, I, I^c, I^d, SOC) + \pi \sum_{i \in N^F} I_i \alpha_i + \pi \sum_{i \in N^S} I^c_{bat,j} I^d_{bat,j},$$

where $\pi$ is a penalty parameter.

With the above formulation, the optimization problem always possesses a strict interior. This is in contrast with a prior art approach where the problem loses the strict interior in the limit. Thus, the penalty formulation removes some of the deficiencies of the inequality formulation. However, it is possible that at a solution of the penalized formulation some of $I_i, \alpha_i$ can violate the complementarity constraint. The barrier problem for this relaxation is $$\min f_\pi(V, I, I^c, I^d, SOC) - \qquad (12)$$
$$\mu \left( \sum_{i \in N^F} \ln(I_i) + \ln(\alpha_i) \right) - \mu \left( \sum_{i \in N^S} \ln(I^c_{bat,j}) + \ln(I^d_{bat,j}) \right)$$
$$\text{s.t. } h(V, V_{bat}, V_{ter}, I, I^L, I^c, I^d, I^c_{bat}, I^d_{bat}, \alpha, SOC) = 0$$
$$g(V, V_{bat}, V_{ter}, I, I^c, I^d, I^c_{bat}, I^d_{bat}, SOC) + s = 0.$$

Inequality Reformulation

To implement complementarity relaxation, some embodiments formulate the complementarity constraint as inequalities. Some variations of those embodiments use the barrier parameter to modify the constraint evaluation for the complementarity constraints.

FIG. 8 shows plots 810 and 820 illustrating relaxation 830 of the complementarity constraints by multiple parameters, e.g., the barrier parameter $\mu$, and the relaxation parameter $\delta$. Both parameters can be tightened dependently. In this embodiment, the constraints are strictly feasible interior for some complementarity constraints even as $\mu$ approaches zero, which can increase a performance of the optimization method.

For example, in one embodiment, the complementarity constraint is reformulated as $$I_i \alpha_i \leq \delta \mu$$
$$I_{bat,i}^c I_{bat,i}^d \leq \delta \mu' \qquad (13)$$

where $\delta > 0$. The complementarity constraint is increased by an amount proportional to the barrier parameter. Hence, for all $\mu > 0$, there exists a strict interior for the barrier problem. As the barrier parameter $\mu$ approaches zero, we converge to a solution of the MPCC in Eqn. (8). The barrier problem for this relaxation is $$\min f(V, I, I^c, I^d, SOC) - \mu \left( \sum_{i \in N^F} \ln(I_i) + \ln(\alpha_i) + \ln(s^c_i) \right) - \qquad (14)$$
$$\mu \left( \sum_{i \in N^S} \ln(I^c_{bat,j}) + \ln(I^d_{bat,j}) + \ln(s^c_i) \right)$$
$$\text{s.t. } h(V, V_{bat}, V_{ter}, I, I^L, I^c, I^d, I^c_{bat}, I^d_{bat}, \alpha, SOC) = 0$$
$$g(V, V_{bat}, V_{ter}, I, I^c, I^d, I^c_{bat}, I^d_{bat}, SOC) + s = 0$$
$$I_i \alpha_i + s^c_i = \delta \mu \forall i \in N^F$$
$$I^c_{bat,j} I^d_{bat,j} + s^i_c = \delta \mu \forall i \in N^S.$$

FIG. 9 shows the pseudocode of the method for the above complementarity inequality reformulation. Steps 1-3 of the method initialize the variables, set the iteration parameters, and select constraints. Steps 5-7 solves iteratively the above barrier problem (14).

Adaptive Relaxation

FIG. 10 shows a schematic of another method according another embodiment of the invention. This embodiment is based on a realization that with reduction of the relaxation parameter, the well-posed problems are progressively transformed into ill-posed problems. Therefore, it is advantageous to reduce the relaxation parameter only when necessary. Thus, one embodiment of the invention optimizes the control parameters iteratively using adaptive modification 1010 of a relaxation parameter. In this embodiment, for each iteration, the relaxation parameter is modified 1020 only if the complementarity constraint of the solution for a current value of the relaxation parameter is violated.

For example, in one iteration of the method for optimizing the control parameters iteratively using adaptive modification of a relaxation parameter, a current value of the relaxation parameter define the feasible region under the curve 735. If the solution 1030 of the method for this iteration is feasible, i.e., under the curve 735, the next iteration does not update the relaxation parameter, i.e., skip the relaxation parameter that defines the curve 1020, and uses the relaxation parameter of the curve 735 instead. Thus the next iteration optimizes the value 1030 using the relaxation parameter of the curve 735, which is more well-posed problem than problem for relaxation parameter of the curve 1020. If the solution of the next iteration violates the relaxed complementarity constraints, the relaxation parameter is modified, e.g., to correspond to the curve 737.

Inequality Reformulation with Adaptive Relaxation

Figure 11:
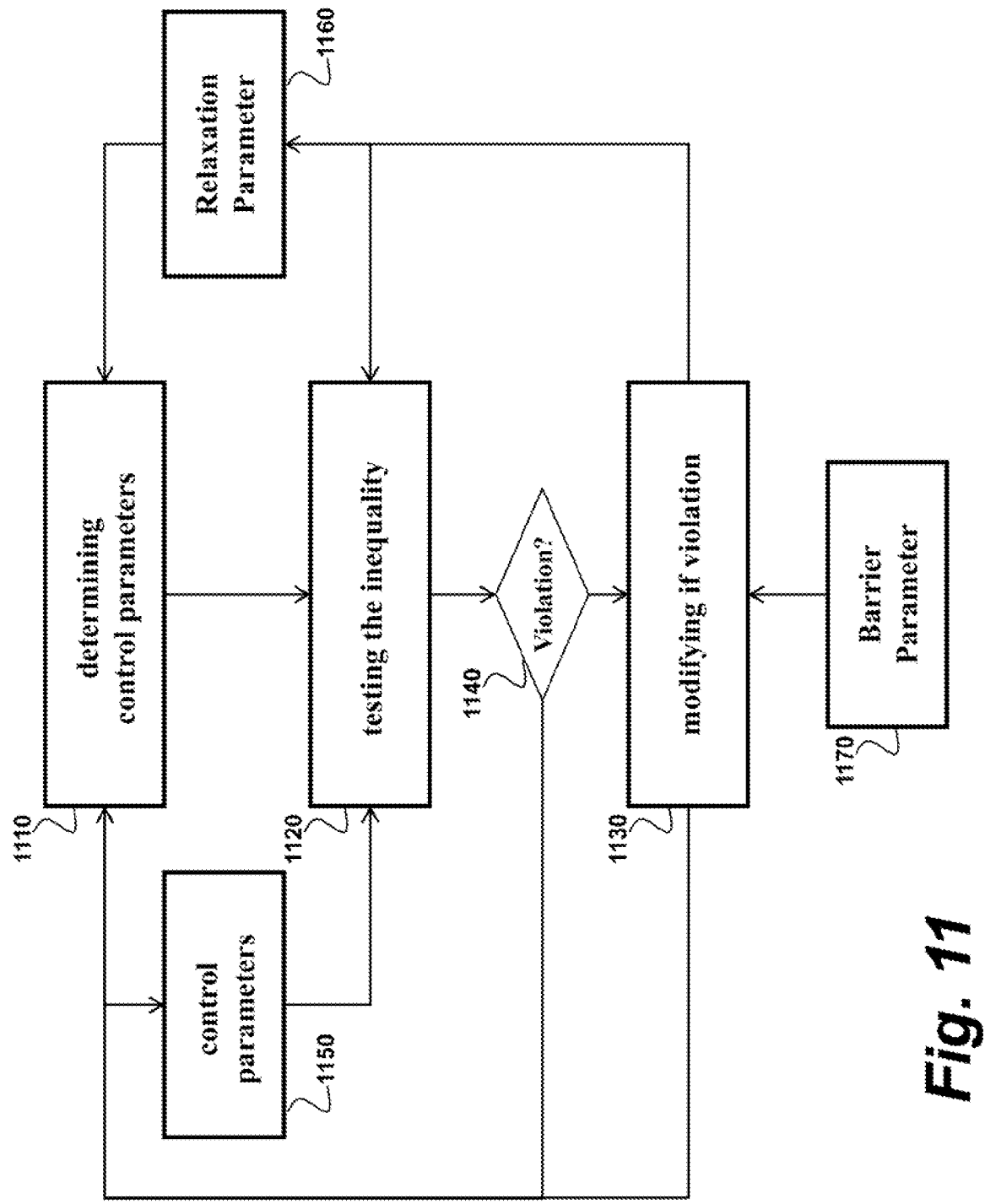
FIG. 11 is a block diagram of an optimization method according to one embodiment of the invention.

FIG. 11 shows a block diagram of a method according to one embodiment of the invention. In one variation of this embodiment, the complementarity constraint for a substation of the railway system includes a product of a current at the substation and an excessive voltage at the substation. The optimization according to this embodiment reformulates the complementarity constraint as an inequality, such that the product of the current and the excessive voltage is less than a relaxation parameter 1160. Next, this embodiment determines 1110 the control parameters 1150 iteratively based on the inequality, wherein a value of the relaxation parameter is adaptively reduced for subsequent iterations. In one variation of this embodiment, the current iteration includes determining the control parameters based on values of the control parameters determined during a previous iteration. The inequality is tested 1140 using values of the control parameters corresponding to that of the current and the excessive voltage of the substation, and the value of the relaxation parameter is modified 1130 if the inequality is violated 1140.

Some embodiments combine adaptive relaxation with an interior point method to further optimize the solution. For example, one embodiment determines the relaxation parameter to be proportional to the barrier parameter 1170. This proportionality simplifies determining of the modified value of relaxation parameter in subsequent iterations. This is because the barrier parameters are monotonically decreasing, and when the relaxed complementarity constraint is violated, the relaxation parameter is modified to match appropriately the reduction in barrier parameter.

For example, the embodiment relaxes each complementarity constraint as $$I_i \alpha_i \leq \eta_i,$$

$$I_{bat,i}^c I \leq bat, i^d \leq \eta_i' \quad (15)$$

where >0. The relaxation is adaptively tightened. The barrier problem for this relaxation is $$\min f(V, I, I^c, I^d, SOC) - \mu \left( \sum_{i \in N^F} \ln(I_i) + \ln(\alpha_i) + \ln(s_i^c) \right) - \quad (16)$$

$$\mu \left( \sum_{i \in N^S} \ln(I_{bat,j}^c) + \ln(I_{bat,j}^d) + \ln(s_i^c) \right)$$

$$\text{s.t. } h(V, V_{bat}, V_{ter}, I, I^L, \alpha, SOC) = 0$$

$$g(V, V_{bat}, V_{ter}, I, I^c, I^d, SOC) + s = 0$$

$$I_i \alpha_i + s_i^c = \eta_i \, \forall \, i \in N^F$$

$$I_{bat,j}^c I_{bat,j}^d + s_c^j = \eta_i \, \forall \, i \in N^S.$$

FIG. 11 shows the pseudocode 1200 for solving the barrier problem (16) with adaptive relaxation.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for optimizing energy consumption in a railway system including a set of trains, a set of energy storage devices, and a set of substations connected to a grid, comprising the steps of:
    optimizing control parameters controlling at least part of the energy consumption of the railway system to produce optimized control parameters, wherein the optimized control parameters minimize, over multiple time steps, a combination of total power provided by the grid to satisfy a power demand of the railway system, a state-of-charge of each energy storage device, power supplied to charge the energy storage device and power supplied by the energy storage device, wherein the optimizing is subject to constraints on operations of the railway system over multiple time steps, the constraints include a complementarity constraint; and
    generating a command to control the energy consumption of the railway system based on the optimized control parameters, wherein steps of the method are performed by a processor.

2. The method of claim 1, wherein the set of trains includes a set of power consuming trains and a set of power regenerating trains, and wherein the control parameters include values of voltages and currents for each substation, voltages and currents for the set of energy storage devices and for each train.

3. The method of claim 2, further comprising:
    determining a state of the railway system at a point of time, wherein the state includes locations of the trains, and the power demand of the power consuming trains; and
    optimizing the control parameters according to the state.

4. The method of claim 3, further comprising:
    modifying the state based on measurements of the state at the point of time.

5. The method of claim 1, wherein the optimization is performed over a single time-step wherein the minimization objective is a linear combination of power supplied by substations, weighted combination of power supplied to charge the energy storage device and power supplied by the energy storage device.

6. The method of claim 3, further comprising:
    determining the state based on run curves of the trains.

7. The method of claim 5, wherein the weights change over time.

8. The method of claim 1, wherein the complementarity constraint includes a product of a discharging current at the energy storage device and a charging current at the energy storage device.

9. The method of claim 8, wherein the complementarity constraint is an inequality, such that the product of the discharging current at the energy storage device and the charging current at the energy storage device is less than a relaxation parameter.

10. The method of claim 1, wherein the set of devices is distributed throughout the railway system.

11. The method of claim 1, further comprising:
    controlling the energy storage devices using an objective function that depends on a combination of energy withdrawn from the substations, energy withdrawn from the energy storage devices and energy charged into the energy storage devices, and wherein the objective function reflects a cost for discharging energy from the energy devices and reward for charging energy into the energy storage devices.

12. The method of claim 11, further comprising:
    solving the objective function for the cost over an infinite time horizon.

13. A system for optimizing energy consumption in a railway system including a set of trains, a set of energy storage devices and a set of substations connected to a grid, comprising:
    a processor for optimizing control parameters controlling at least part of the energy consumption of the railway system to produce optimized control parameters, wherein the optimized control parameters minimize, over multiple time steps, a combination of total power provided by the grid to satisfy a power demand of the railway system, a state-of-charge of each energy storage device, power supplied to charge the energy storage device and power supplied by the energy storage device, wherein the optimizing is subject to constraints on operations of the railway system over multiple time steps, and the constraints include a complementarity constraint, and wherein the processor generates a command to control the energy consumption of the railway system based on the optimized control parameters.

* * * * *